United States Patent
Ali et al.

(10) Patent No.: US 10,947,442 B2
(45) Date of Patent: Mar. 16, 2021

(54) HYDRATABLE POLYMER SLURRY AND METHOD FOR WATER PERMEABILITY CONTROL IN SUBTERRANEAN FORMATIONS

(71) Applicant: Schlumberger Technology Corporation, Sugar Land, TX (US)

(72) Inventors: Syed Afaq Ali, Sugar Land, TX (US); Arthur Milne, Quito (EC); Emilio Jose Miquilena, Campeche (MX); Yenny Christanti, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 27 days.

(21) Appl. No.: 15/187,058

(22) Filed: Jun. 20, 2016

(65) Prior Publication Data
US 2016/0369153 A1    Dec. 22, 2016

Related U.S. Application Data
(60) Provisional application No. 62/182,996, filed on Jun. 22, 2015.

(51) Int. Cl.
| | |
|---|---|
| C09K 8/502 | (2006.01) |
| C08K 3/34 | (2006.01) |
| C08K 5/17 | (2006.01) |
| C09K 8/32 | (2006.01) |

(52) U.S. Cl.
CPC ............ *C09K 8/502* (2013.01); *C08K 3/346* (2013.01); *C08K 5/17* (2013.01); *C09K 8/32* (2013.01)

(58) Field of Classification Search
CPC ....................................................... C09K 8/64
See application file for complete search history.

(56) References Cited

U.S. PATENT DOCUMENTS

| | | | |
|---|---|---|---|
| 3,881,552 A | 5/1975 | Hessert | |
| 5,913,364 A * | 6/1999 | Sweatman | C09K 8/035 166/281 |
| 6,011,075 A * | 1/2000 | Parris | C09K 8/512 166/292 |

(Continued)

FOREIGN PATENT DOCUMENTS

| | | |
|---|---|---|
| EP | 0051264 B1 | 12/1984 |
| EP | 0864725 A1 | 9/1998 |
| WO | 2014088815 A1 | 6/2014 |

OTHER PUBLICATIONS

Sydansk et al., "When and Where Relative Permeability Modification Water-Shutoff Treatments can be Successfully Applied", SPE 99371 presented at the 2006 SPE/DOE Symposium on Improved Oil Recovery, Apr. 22-26, 2006, Tulsa, Oklahoma, USA, pp. 1-15.

*Primary Examiner* — William D Hutton, Jr.
*Assistant Examiner* — Avi T Skaist
(74) *Attorney, Agent, or Firm* — Rodney Warfford

(57) ABSTRACT

A water-free slurry may include a non-aqueous carrier fluid; a suspension agent including a mineral clay mixture; a crosslinking agent; and a hydratable polymer. A method of treating a subterranean formation may include injecting a water-free slurry into a wellbore penetrating the subterranean formation, the water-free slurry including: a non-aqueous carrier fluid; a suspension agent comprising a mineral clay mixture; a crosslinking agent; and a hydratable polymer.

8 Claims, 5 Drawing Sheets

(56) References Cited

U.S. PATENT DOCUMENTS

| | | | | |
|---|---|---|---|---|
| 6,036,765 A | * | 3/2000 | Farrow | C04B 24/425 |
| | | | | 106/287.17 |
| 7,199,084 B2 | | 4/2007 | Parris et al. | |
| 7,304,019 B2 | | 12/2007 | Lin et al. | |
| 8,236,739 B2 | | 8/2012 | Putzig | |
| 8,252,731 B2 | | 8/2012 | Putzig | |
| 2003/0181532 A1 | | 9/2003 | Parris et al. | |
| 2010/0048429 A1 | * | 2/2010 | Dobson, Jr. | C09K 8/685 |
| | | | | 507/212 |
| 2011/0114318 A1 | * | 5/2011 | Ezell | C09K 8/5045 |
| | | | | 166/305.1 |
| 2013/0025860 A1 | * | 1/2013 | Robb | C09K 8/035 |
| | | | | 166/279 |
| 2014/0305646 A1 | * | 10/2014 | Chew | C08L 23/18 |
| | | | | 166/305.1 |
| 2015/0021027 A1 | * | 1/2015 | Chapman | C09K 8/035 |
| | | | | 166/292 |

* cited by examiner

HYDRATABLE POLYMER SLURRY AND METHOD FOR WATER PERMEABILITY CONTROL IN SUBTERRANEAN FORMATIONS

BACKGROUND

The invasion of water in hydrocarbon producing reservoirs is an issue faced by major oilfield petroleum operators, especially in mature fields. This problem of controlling the unwanted production of water is even more challenging in naturally fractured carbonate or sandstone reservoirs, as both the oil and water flow preferentially through the natural fractures and fissures.

The most common technique used to control unwanted water production in naturally fractured reservoirs is to plug the interval that is producing water and recomplete in another interval above the oil/water contact. Polymeric gels are frequently used in this application. These polymers are most commonly pumped in a low viscosity fluid with a crosslinking agent and with time and temperature the polymer is cross-linked creating a rigid gel creating a plug that blocks water production. The success of the treatments such as this depend on the appropriate polymer and crosslinking agent selection and the placement of the treatment fluid into the correct water bearing interval. Further, the success of the treatment depends on the strength of the final rigid gel and its stability in downhole conditions.

However, when it is not possible to recomplete the well in another interval there is a need to selectively shut-off the water in only the water producing interval. In matrix (non-fractured) reservoirs relative permeability modifiers are used for this purpose. However, relative permeability modifiers are not effective in controlling water in natural fractures or fissures and the use of rigid (crosslinked) gels frequently results in shutting off the production of both oil and water as their placement may not be highly controllable and selective.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a water-free slurry that includes a non-aqueous carrier fluid; a suspension agent including a mineral clay mixture; a crosslinking agent; and a hydratable polymer.

In another aspect, embodiments disclosed herein relate to a method of treating a subterranean formation that includes injecting a water-free slurry into a wellbore penetrating the subterranean formation, the water-free slurry including: a non-aqueous carrier fluid; a suspension agent comprising a mineral clay mixture; a crosslinking agent; and a hydratable polymer.

Other aspects and advantages of the claimed subject matter will be apparent from the following description and the appended claims.

DETAILED DESCRIPTION

Figure 1:
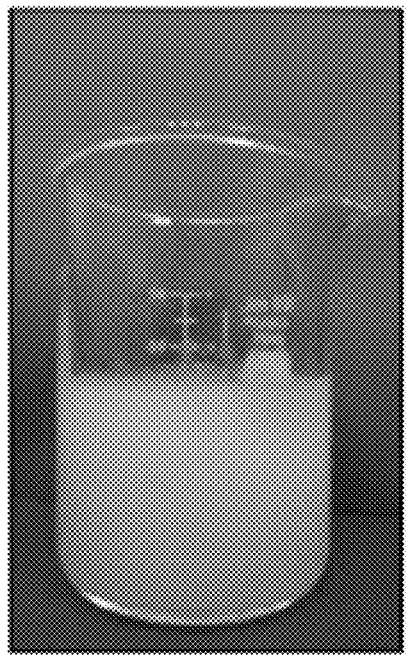
FIG. 1 shows the homogenous mixture, discussed in Example 3, formed by mixing water-free slurry and tap water.

The present disclosure relates to methods and compositions for subterranean formation treatment, more particularly, to methods and compositions for plugging of permeable zones and leaks in subterranean formations.

As discussed above, present methods employing the use of rigid (crosslinked) gels to plug permeable zones and leaks in subterranean formations frequently result in non-selectively shutting off the production of both oil and water as their placement may not be highly controllable and selective. Hence a composition and method where a gel will only be activated and cross-linked when in the presence of water, but delivered with non-aqueous carrier fluid to the zone of treatment, could be a selective treatment that is a marked improvement over current methods. Specifically, this treatment composition and method may make it possible to selectively shutoff unwanted water production intervals without decreasing the permeability of oil production intervals.

In one or more embodiments, methods of water control and isolation of water intervals disclosed herein comprises the pumping of a slurry of a hydratable polymer and a particulate crosslinking agent dispersed in a water-free solvent (mutual solvent, organic solvent, or hydrocarbon solvent) into a target zone. In the absence of water, the solid crosslinking agent will not react with the water-soluble particulate polymer because both are in particulate form and slurrified within the carrier fluid. However, upon the contact with formation water, the polymer and the crosslinking agent within the water-free carrier fluid is mixed with water, undergoes hydration (dissolving) and becomes cross-linked with the solubilized crosslinking agent resulting in rigid gel that may selectively plug the target zone.

In one or more embodiments, the hydratable polymer may be any water-soluble, viscosity-enhancing polymer or mixture of polymers generally known in the art to yield an increase in viscosity upon hydration. Thus, hydratable polymers may include polyacrylamide and acrylamide copolymers thereof including acrylamide sodium acrylate copolymer, any natural or modified natural polymers including polysaccharides and modified polysaccharides and related polymeric materials such as guar, hydroxypropyl guar (HPG), hydrophobically modified hydroxypropyl guar (HMHPG), carboxymethyl guar (CMG), carboxymethyl hydroxypropyl guar (CMHPG); carboxymethyl hydroxyethyl cellulose (CMHEC), carboxymethylcellulose, other cellulosics and cellulosic derivatives such as hydroxyethylcellulose and hydroxypropylcellulose; xanthan gum, modified starches, glucomannan gums, succinoglycan, scleroglycan, o-carboxychitosans, polyvinyl saccharides, heteropolysaccharides (such as diutan by nonlimiting example, and similar biopolymers and mixtures thereof.

In one or more embodiments, the hydratable polymer may be in the form of microbeads. More specifically, in one or more embodiments, a majority of the hydratable polymer microbeads may have diameters greater than about 100 microns, or greater than about 200 microns, or greater than about 300 microns. In one or more embodiments, the hydratable polymer microbeads may have a $d_{10}$ of at least 150 microns. In one or more embodiments, the hydratable polymer may have a $d_{50}$ of at least about 300 microns and up to about 425 microns. In one or more embodiments, the hydratable polymer may have a $d_{90}$ of at least about 425 microns and up to 600 microns, or 1000 microns. Traditionally, and even though they may have a more flowable morphology and avoid dusting problems during their slurrification, hydratable polymers in the form of microbeads have not found use in water-free oil or solvent-based suspensions because of issues with suitably suspending the hydratable polymer and also ensuring its rapid hydration upon mixing with formation water.

In one or more embodiments, the hydratable polymer may be included in the water-free slurry in an amount ranging from about 5% to 40% by weight of the water-free slurry, or from about 6% to 35% by weight of the water-free slurry, or from about 7% to 30% by weight of the water free slurry, or from about 7% to 25% by weight of the water free slurry.

In the present disclosure, a suspending agent may be used to provide viscosity and thixotropic properties to the suspension so that the suspended hydratable polymer particles are prevented from settling. In one or more embodiments, the suspending agent may be a mineral clay mixture and more particularly an organophilic mineral clay mixture. In one or more embodiments, the mineral clay mixture may be treated with alkyl quaternary ammonium compounds in order to render the mineral clay mixture hydrophobic; such clays may also be termed organophilic. In one or more embodiments, the mineral clay mixtures comprises: a mineral clay (a) comprising 50 to 95 wt. %, based on the weight of the mineral clay mixture, or 60 to 95 wt. %, or 70 to 90 wt. % of a mineral clay selected from the group consisting of sepiolite, palygorskite and mixtures of sepiolite and palygorskite; and a mineral clay (b) comprising the balance by weight of the mineral clay mixture, of a smectite. In one or more embodiments, the smectite may be a natural or synthetic clay mineral selected from the group consisting of hectorite, montmorillonite, bentonite, beidelite, saponite, stevensite and mixtures thereof. The Garamite line of products available from BYK Additives, (Gonzalez, Tex.) are representative examples of mixed mineral clay products.

Both sepiolite and palygorskite are included in the broad grouping of phyllosilicates, or sheet silicates, because they contain a continuous two-dimensional tetrahedral sheet of composition $T_2O_5$ (T=Si, Al, Be, . . . ) but they differ from other layer silicates in lacking continuous octahedral sheets. Thus, they may have properties that differ from other layer silicates and the mineral clay mixture described above may also have differing properties as a result of their presence in the admixture. For example, when compared on a mass basis, the same mass of the mineral clay mixture may have a larger bulk volume than conventional suspending agents that use only smectite type layer silicates. As a result of the increased bulk volume, when using the mineral clay mixture it may be possible to use less suspending agent than is conventionally used to achieve the fluid properties to suspend hydratable polymer therein. The use of less suspending agent may also facilitate easier mixing of the mineral clay mixture into the carrier fluid.

In one or more embodiments, the alkyl quaternary ammonium salts employed for treating the mineral clay mixtures comprise alkyl quaternary ammonium salts containing the same or different straight and/or branched-chain saturated and/or unsaturated alkyl groups of 1 to 22 carbon atoms and the salt moiety is selected from the group consisting of chloride, bromide, methylsulfate, nitrate, hydroxide, acetate, phosphate and mixtures thereof. In one or more embodiments, the alkyl quaternary ammonium salts are dimethyl di(hydrogenated tallow) ammonium chloride, methylbenzyl di(hydrogenated tallow) ammonium chloride, dimethylbenzyl hydrogenated tallow ammonium chloride, dimethyl hydrogenated tallow-2 ethylhexylammonium methylsulfate and mixtures of two or more of the above.

Examples of other organophilic clays include Tixogel®, a product available from United Catalyst Inc. (Louisville, Ky.), Bentone®, a product available from Rheox Company (Hightestown, N.J.), and Claytone®, a product available from BYK Additives (Gonzalez, Tex.).

In one or more embodiments, the suspending agent may be included in the water-free slurry in an amount ranging from about 0.1% to 10% by weight of the water-free slurry, or from about 0.25% to 8% by weight of the water-free slurry, or from about 0.35% to 6% by weight of the water free slurry, or from about 0.5% to 4% by weight of the water free slurry.

In one or more embodiments, a hydratable polymer slurry may include a solid crosslinking agent. The use of a solid crosslinking agent may be effective to reduce or eliminate the occurrence of crosslinking before the hydration of the hydratable polymer by limiting their contact in the water-free slurry until mixed with a sufficient amount of aqueous fluid to solubilize the solid components. The solid crosslinking agent may use multivalent metal ion compounds or complexes that are believed to rely on coordination covalent bonding between the hydratable polymer chains or they may be organic crosslinking agents that form covalent bonds between hydratable polymer chains. Some organic crosslinking agents may rely on chemistry developed from the crosslinked resins obtained by the combination of phenol and formaldehyde. However, due to toxicity issues the formaldehyde may be replaced with hexamethylenetetramine (HETA), glyoxal, paraformaldehyde, acetaldehyde, propionaldehyde, butyraldehyde, and the like, while phenol can be substituted with hydroquinone, resorcinol, pyrogallol, phenyl salicylate, and the like. In one or more embodiments, the formaldehyde or formaldehyde replacement compounds may be used solely as the only crosslinking agent (primary crosslinking agent) to crosslink the hydratable polymers. In some embodiments, the phenol or phenol replacement compounds may be used as a secondary crosslinking agent that can help stabilize gels crosslinked by the primary crosslinker at elevated temperatures. In one or more embodiments, polyethyleneimine may also be used as a crosslinking agent for a copolymer of acrylamide and tert-butylacrylate.

In one or more embodiments, the solid crosslinking agent may be at least one selected from polyethyleneimine, hexamethylenetetramine (HETA), glyoxal, paraformaldehyde, acetaldehyde, propionaldehyde, butyraldehyde, 1,3,5-trioxane, and terepthaldehyde. Not to be bound by theory, but it is believed that the hydrolysis of HETA, paraformaldehyde, and 1,3,5-trioxane leads to the release of aldehydes that actually crosslink the hydratable polymer. In one or more embodiments, secondary crosslinking agents as indicated above may also be included in the water-free slurry.

The multivalent metal ions that may be used as solid crosslinking agents for the hydratable polymer may include chromium-based, zirconium-based, aluminum-based, and titanium-based compounds and complexes. In one or more embodiments, the multivalent metal ion complex may be zirconium ion complexed by a hydroxyalkylated ethylene diamine ligand, such as N,N,N',N'-tetrakis-(2-hydroxypropyl)ethylenediamine and N,N,N',N'-tetrakis-(hydroxyethyl)ethylenediamine. Further, the zirconium ion complex may include those disclosed in U.S. Pat. Nos. 8,252,731 and 8,236,739.

In one or more embodiments, the solid crosslinking agent may be included in the water-free slurry in an amount ranging from about 0.1% to 10% by weight of the water-free slurry, or from about 0.25% to 8% by weight of the water-free slurry, or from about 0.35% to 6% by weight of the water free slurry, or from about 0.5% to 4% by weight of the water free slurry.

In one or more embodiments, the hydratable polymer slurry may include a crosslinking accelerator. In one or more embodiments, the crosslinking accelerator may be a solid that hydrolyzes in water to release an acid. Once released, the acid may serve to accelerate the hydrolysis of a crosslinking agent, thereby releasing higher amounts of crosslinking species to react with polymer. In one or more embodiments, the crosslinking accelerator may be polyglycolic acid (PGA) and other acid derivatives including acid derivatives of esters, ortho esters, poly(ortho esters), aliphatic polyesters, lactides, poly(lactides), glycolides, poly(glycolides), lactones, poly(ε-caprolactones), poly(hydroxybutyrates); anhydrides; poly(anhydrides); and poly(amino acids). In one or more embodiments, the crosslinking accelerator may have a particle size of less than 50 microns, 40 microns, 30 microns, or 25 microns.

In one or more embodiments, the crosslinking accelerator may be included in the water-free slurry in an amount ranging from about 0.1% to 10% by weight of the water-free slurry, or from about 0.25% to 8% by weight of the water-free slurry, or from about 0.35% to 6% by weight of the water free slurry, or from about 0.5% to 4% by weight of the water free slurry.

In one or more embodiments, the water-free hydratable polymer slurry may include a polymeric suspension stabilizer. In one or more embodiments, the polymeric suspension stabilizer may be selected from polysaccharides including diutan gum, xanthan gum, dextran, welan gum, gellan gum, pullulan, hydroxyethyl cellulose, hydroxypropyl cellulose, guar, and guar derivatives. The polymeric suspension stabilizer is a distinct and different component than the hydratable polymer. Thus, if a particular hydratable polymer is used in the water-free slurry then a polymeric suspension stabilizer will be a compound having a differing composition than the hydratable polymer. When water is encountered, the polymeric suspension stabilizer may keep the hydratable polymer suspended while polymer hydration is taking place. Whereas some polymeric suspension stabilizers may not perform as well at elevated temperatures, some polymeric suspension stabilizers, for example diutan gum, may be able to suspend hydratable polymers during their hydration at elevated temperatures. Further, the addition of a polymeric suspension stabilizer to a carrier fluid may provide the fluid with pseudoplastic properties. Fluids with pseudoplastic properties exhibit viscosity which increases and decreases virtually instantaneously in response to the removal and application of shear, respectively. Thus, a pseudoplastic fluid may readily flow, while also being capable of suspending or stabilizing solid components therein.

In one or more embodiments, the polymeric suspension stabilizer may be included in the water-free slurry in an amount ranging from about 0.5% to 10% by weight of the water-free slurry, or from about 0.75% to 8% by weight of the water-free slurry, or from about 1.5% to 6% by weight of the water-free slurry.

A carrier fluid or solvent base fluid for forming the hydratable polymer slurry according to the present disclosure can generally be any fluid that will suspend a dispersion of the suspension agent and the hydratable polymer to form a suspension in which the polymer is not soluble and where the suspension has a relatively high polymer concentration but a viscosity low enough to be pumpable under oilfield service conditions. The carrier fluid also should not hydrate the polymer being suspended. The polymer should not be readily soluble in the solvent or the concentrated suspension may become too viscous or may form a liquid or a solid. The carrier fluid base can be selected from one of three groups of compounds. In one or more embodiments a first group may include low viscosity, low-volatility mutual solvents and mixtures thereof. The term "mutual solvent" is meant to indicate a solvent that can dissolve in substantial amounts both hydrophilic and lipophilic substances, in other words, a mutual solvent according to the present disclosure is miscible with water-based and oil-based fluids. Mutual solvents may include by way of non-limiting examples various alcohols including 2-butoxyethanol, glycols and glycol ethers such as: ethylene glycol monobutyl ether (EGMBE) (available from The Dow Chemical Company, Midland, Mich., under the trade name Dowanol® EB), hexylene glycol, 2-methyl hexanol, propylene glycol n-butyl ether, ethylene glycol methyl ether, ethylene glycol ethyl ether, dipropylene glycol methyl ether (available from The Dow Chemical Company, Midland, Mich., under the trade name Dowanol® DPM), dipropylene glycol n-butyl ether (available from The Dow Chemical Company, Midland, Mich., under the trade name Dowanol® DPnB), diethylene glycol ethyl ether, propylene glycol, diethylene glycol methyl ether, and the like. In one or more embodiments, mutual solvents may be used in combination with a hydrocarbon solvent such as mineral oil, however, in other embodiments mutual solvents may be used without a hydrocarbon solvent. Not all mutual solvents are suitable; excluded are those that are too viscous or that form polymer suspensions that are too viscous under normal operating conditions. Specifically, it is highly desirable to have one formulation that can be used under a variety of conditions, and very undesirable to have a formulation that cannot be used under certain conditions. For example, larger polyethylene glycols (PEG's), even relatively low molecular weight materials such as PEG 200 or PEG 400 are not suitable because they are too viscous and/or form suspensions that have viscosities that are too high. Suitable mutual solvents have at least one of a molecular weight less than about 200; a freezing points lower than about −75° C., and viscosities less than about 5 cP at 25° C.

In one or more embodiments, a second group of compounds from which the carrier fluid may be selected comprises any of the mono alkyl esters of long chain fatty acids, derived from vegetable oils or animal fats that are commonly termed "biodiesel". These are known materials in the fuels and engine industries, as fuels for compression-ignition (diesel) engines. The pure materials are known as "B100" biodiesel. Mixtures with conventional petroleum diesel fuels are known as "Bxyz" biodiesel, where xyz is the percent biodiesel in the fuel. B100 is useful in the present application. Biodiesel is made by reacting the vegetable oils and/or animal fats with an alcohol; methanol is the usual choice but other alcohols may be used. Biodiesel is non-toxic and biodegradable. Biodiesel is available from many sources, including Biodiesel Industries, Marathon, Fla.; Stepan Company, Northfield, Ill.; and West Central Soy, Ralston, Iowa. Biodiesel is formulated for its burning characteristics, and certain physical properties such as pour point, volatility and boiling point. Its characteristics as a solvent and its miscibility with other materials are not a factor in its manufacture.

In one or more embodiments, a third group of compounds from which the carrier fluid may be selected comprises hydrocarbon fluids, including aliphatic hydrocarbons, diesel, and the like. In some embodiments, aromatic groups in the carrier fluid may be avoided in carrier fluids and/or are present in low amounts since aromatic groups can influence the gelling process of a hydrated polymer. In one or more embodiments, the aliphatic hydrocarbon is used in mixture with the mutual solvents containing pendent hydroxyl functional groups. Suitable examples of aliphatic hydrocarbons include, but are not limited to: cyclohexane; Exxsol® solvents commercially available from ExxonMobil including Exxsol® D40, D60, D80, D110, and the like; heptane; hexane; lactane; low-aromatic base oil; mineral oil; white mineral oil; mineral seal oil; mineral spirits; VM & P naphtha; kerosene; hydrotreated kerosene; diesel; middle distillate fuels; isoparaffinic and naphthenic aliphatic hydrocarbon solvents; dimers and higher oligomers of propylene; butane; hydrotreated light petroleum distillates; and the like. Particularly useful may be a naphthenic type hydrocarbon solvent having a boiling point range of about 91.1° C.-113.9° C. (196°-327° F.) sold as "Exxsol® D80" by ExxonMobil, Houston, Tex. While any functional amount of aliphatic hydrocarbon may be incorporated into the suspension, in some embodiments the amount of aliphatic hydrocarbon is up to about 25% by weight based on total suspension weight, or about 5% to about 20% by weight based on total suspension weight, or about 7% to about 17% by weight based on total suspension weight.

It is to be understood that in one or more embodiments, the carrier fluid can be a mixture of mutual solvents, a mixture of biodiesels, or a mixture of the two, including mixtures of mixtures. The mutual solvents and biodiesel of the present disclosure are much more environmentally friendly than diesel.

In one or more embodiments, the carrier fluid may be included in the water-free slurry in an amount from about 50% to 95% by weight of the water-free slurry, or from about 55% to 92.5% by weight of the water-free slurry, or from about 60% to 90% by weight of the water-free slurry, or from about 65% to 87.5% by weight of the water-free slurry.

In one or more embodiments, the components of the water-free slurry described above may be mixed together by any method known in the art to form a homogenous slurry. In the case of naturally fractured and fissured reservoirs, the slurry of particulate polymer and crosslinking agent may be injected/circulated into intervals producing both oil and water, so the gel solidifies in the fractures and fissures with the highest water saturation. This may provide selective water isolation with the solidified polymer, as the gel won't solidify in oil producing regions. In some embodiments, after pumping/placing the water-free slurry into a wellbore/formation zone of interest, the well may be shut in for a particular period of time so that the polymeric species therein may be able to hydrate and gel/crosslink. In some embodiments, a water-free slurry without any crosslinking agent may be injected into a wellbore/formation zone of interest in order adsorb on the faces of natural fractures or fissures and control/limit water production. In some embodiments, the water-free slurry may also be injected into the wellbore ahead of a stimulation treatment to selectively plug intervals which have high water saturation/production so that the stimulation treatment may be targeted to regions with less water saturation/production. In some embodiments, the water-free slurry of the present disclosure may be used in water injection wells to change the injection profile in an injection well. For example, a water-free polymer slurry with or without crosslinking agent may be bullheaded or injected into the well where it will be activated in the intervals in which water is currently being injected. After it emplacement therein, new intervals may be perforated and used for water injection. In some embodiments, the water-free slurry of the present disclosure may be used to shut off water flow behind a casing. For example, the water-free slurry with a crosslinking agent may be injected into the annular space of a wellbore casing and when in contact with water, the polymer in the slurry will begin to hydrate and crosslink, resulting in a seal for the annular space.

EXAMPLES

Example 1

Slurry Stability Testing

Five water-free slurries were formed using a single carrier fluid, a suspending agent, and a hydratable polymer. Table 1 shows the components used for each slurry and their amounts. The carrier fluid used was ethylene glycol monobutyl ether (EGMBE). The mineral clay mixture used as the suspending agent is Garamite 1958, available from BYK Additives & Instruments. Three different polyacrylamide type polymers were used as the hydratable polymer. Polyacrylamide 1 is Alcoflood® 254S, a granular solid acryalamide sodium acrylate copolymer available from BASF. Polyacrylamide 2 is HE® 300 Polymer, a powdered susbstituted acrylamide polymer available from Drilling Specialties Company. Polyacrylamide 3 is ZETAG®-7565, a bead-like solid ethanaminium, N,N,N-trimethyl-2-[(1-oxo-2-propenyl)oxy]-, chloride, polymer with 2-propenamide available from BASF.

TABLE 1

| Components | % (wt/wt) | | | | |
|---|---|---|---|---|---|
| Slurry # | (1) | (2) | (3) | (4) | (5) |
| EGMBE | 78 | 78 | 88 | 88 | 88 |
| Mineral Clay Mixture | 2 | 2 | 2 | 2 | 2 |
| Polyacrylamide 1 | 20 | — | 10 | — | — |
| Polyacrylamide 2 | — | — | — | — | 10 |
| Polyacrylamide 3 | — | 20 | — | 10 | — |
| Viscosity (cP) at 170 sec$^{-1}$ | 46 | 75 | — | — | — |

The slurry stability was tested by placing a specific volume of slurry in a graduated cylinder and allowing the slurries to age, un-agitated, at room temperature while recording the volume percent of free fluid observed over time. The results of this test are shown in Table 2 below.

TABLE 2

| Time | Slurry Stability (volume % free fluid separated) | | | |
|---|---|---|---|---|
| Slurry # | (1) | (2) | (3) | (4) |
| 5 min | 0 | 0 | 0 | 0 |
| 15 min | 0 | 0 | 0 | 0 |
| 30 min | 0 | 0 | 0 | 0 |
| 1 hour | 1 | 1 | 0 | 0 |
| 2 hour | 1 | 2 | 1 | 1 |
| 4 hour | 2 | 2 | 1 | 2 |
| 6 hour | 4 | 6 | 1 | 2 |
| 8 hour | 8 | 12 | 2 | 4 |
| 24 hour | 12 | 16 | 6 | 10 |

Example 2

Polymer Slurry Hydration

In this example, polymer slurries were tested for their ability to hydrate in a high salinity brine in the form of a simulated formation water. The composition of the simulated formation water is shown in Table 3 below.

TABLE 3

Ionic Composition of Simulated Formation Water

| Cations | mg/L | Anions | mg/L |
|---|---|---|---|
| Na | 41722 | Cl | 77139 |
| K | 2612 | $HCO_3$ | 117 |
| Ca | 9800 | $CO_3$ | 76 |
| Mg | 1385 | OH | 0 |
| Fe | 8 | $SO_4$ | 774 |
| Ba | 49 | | |

A portion of slurries 3-5 from Table 1 above were mixed with an equivalent volume of simulated formation water at room temperature or 70° C. The mixtures were evaluated to see whether there was phase separation and if the polymer hydrated (e.g., the mixture became more viscous). The same test was performed with three slurries (6-8) having compositions the same as slurries 3-5, respectively, with the only difference being that dipropylene glycol methyl ether (DPME) was used as the carrier fluid instead of EGMBE. DPME is known to be miscible with highly saline aqueous solutions. The results of this experiment is shown in Table 4 below.

TABLE 4

| Slurry # | Phase Separation | | Hydration of Polymer | |
|---|---|---|---|---|
| | RT | 70° C. | RT | 70° C. |
| (3) | Yes | No | — | — |
| (4) | Yes | — | No | — |
| (5) | — | No | — | Yes |
| (6) | No | No | — | — |
| (7) | No | No | — | — |
| (8) | No | No | — | — |

Example 3

Polymer Slurry Hydration and Crosslinking

A water-free hydratable polymer slurry was formulated, hydrated by the addition of tap water, and crosslinked. The water-free hydratable polymer slurry #6 was composed of the following: 75 wt. % EGMBE carrier fluid, 2 wt. % mineral clay mixture (Garamite 1958) suspending agent, 20 wt. % Polyacrylamide 1 (see above) as the hydratable polymer, and 3 wt. % hexamethylenetetramine crosslinking agent.

Figure 2:
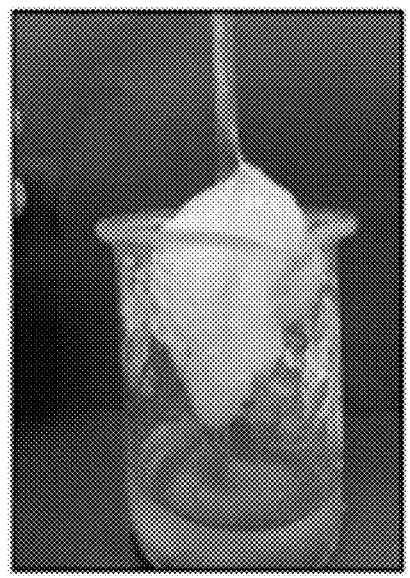
FIG. 2 shows the crosslinked hydratable polymer formed from heating homogenous mixture of FIG. 1.

Prior to the addition of tap water, no hydration of the hydratable polymer or crosslinking of the hydratable polymer was observed. The slurry was mixed with an equivalent volume of tap water at room temperature forming a homogenous mixture, leading to hydration of the hydratable polymer. The homogenous mixture is shown in FIG. 1. Crosslinking of the polymer is observed after heating the homogenous mixture in a water bath at 80° C. The crosslinked hydratable polymer formed from the heated homogenous mixture is shown in FIG. 2.

Example 4

Polymer Slurry (20 wt. %) Hydration Rate in Saline Solution

Slurries of hydratable polymers were tested for their hydration rate in saline solutions as the hydration rate is a monitored parameter for the plugging of water-bearing formation intervals because the crosslinking of the polymers takes place intensively with a hydrated polymer.

Figure 3:
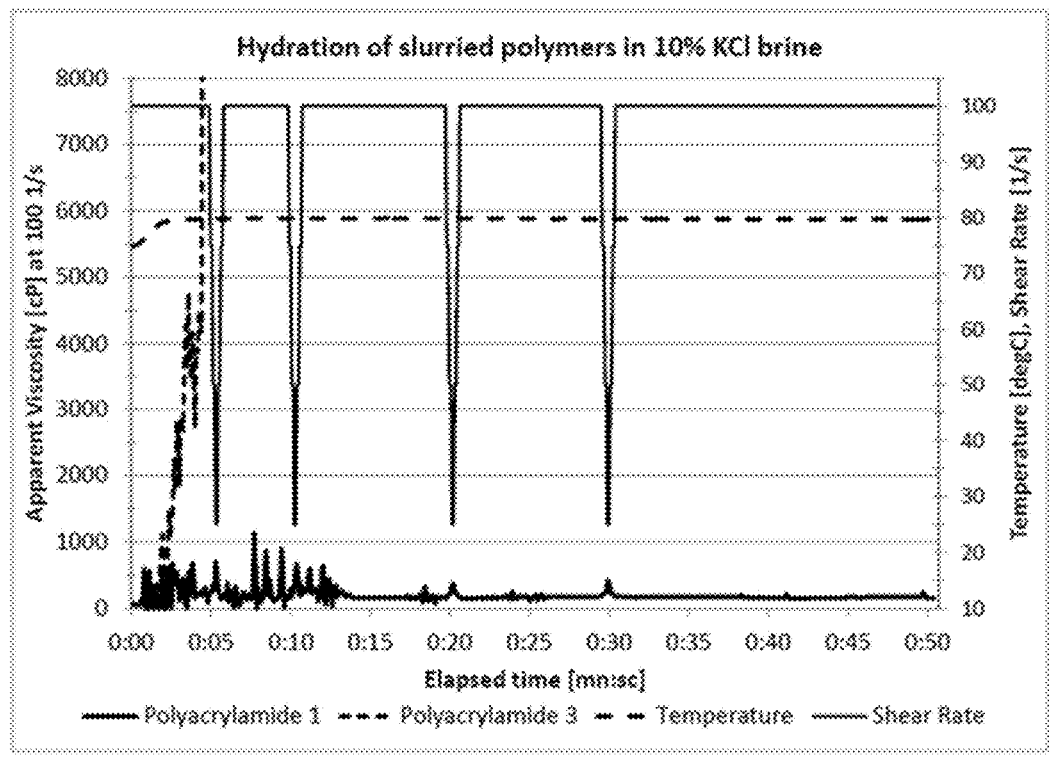
FIG. 3 shows a plot of the hydration of slurried polymers in 10% KCl brine.

The hydration rates of slurries of Polyacrylamide-1 and Polyacrylamide-3 (see above) in saline solutions were tested by measuring the viscosity increase over time for a slurry of 20 wt. % of the hydratable polymer in EGMBE carrier fluid, constituting the balance of the slurry. Equivalent volumes of the respective slurry and 10 wt. % KCl brine were then mixed together. The hydration testing was done at a temperature of 80° C. and a pressure of 1000 psi. The results of the test are shown in the plot of FIG. 3.

Example 5

Polymer Slurry (10 wt. %) Hydration Rate in Saline Solution

Figure 4:
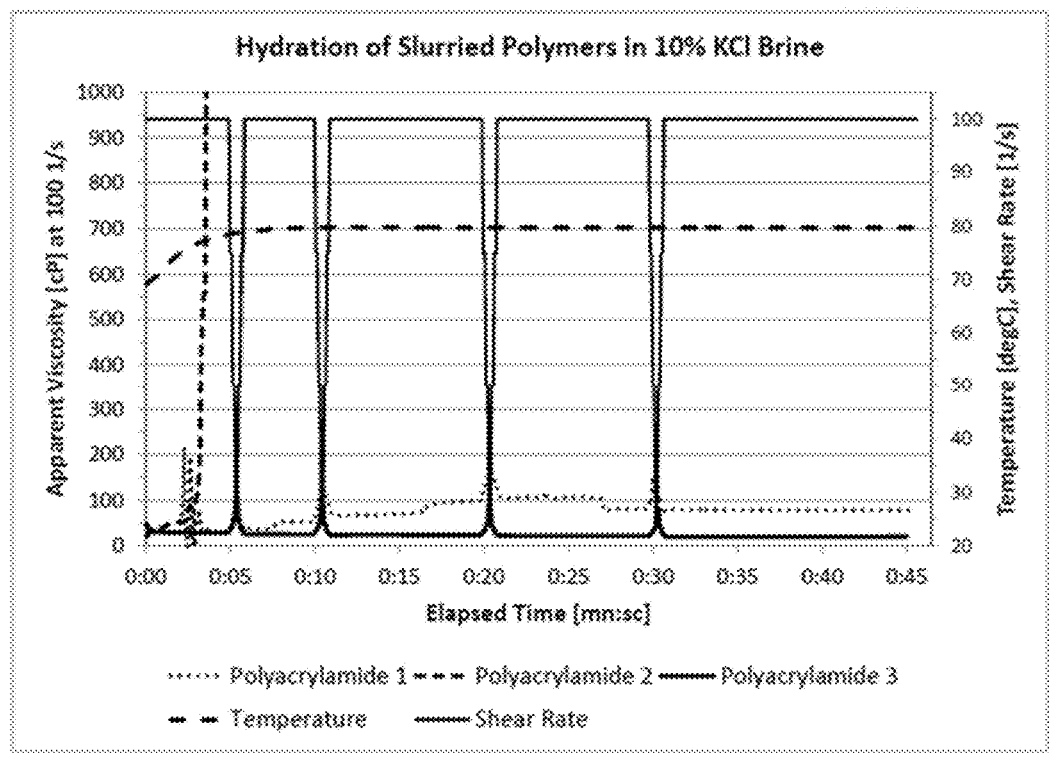
FIG. 4 show a plot of the hydration of slurried polymers in 10% KCl brine.

The hydration rate of slurries of Polyacrylamide-1, Polyacrylamide-2, and Polyacrylamide 3 (see above) in saline solutions were tested by measuring the viscosity increase over time for a slurry of 10 wt. % hydratable polymer, 2 wt. % mineral clay mixture (Garamite 1958) as a suspending agent, and 88 wt. % EGMBE carrier fluid. Equivalent volumes of the respective slurry and 10 wt. % KCl brine were then mixed together. The hydration testing was done at a temperature of 80° C. and a pressure of 1000 psi. The results of the test are shown in the plot of FIG. 4.

Example 6

Polymer Slurry (10 wt. %) Hydration Rate in Different Salinities

Figure 5:
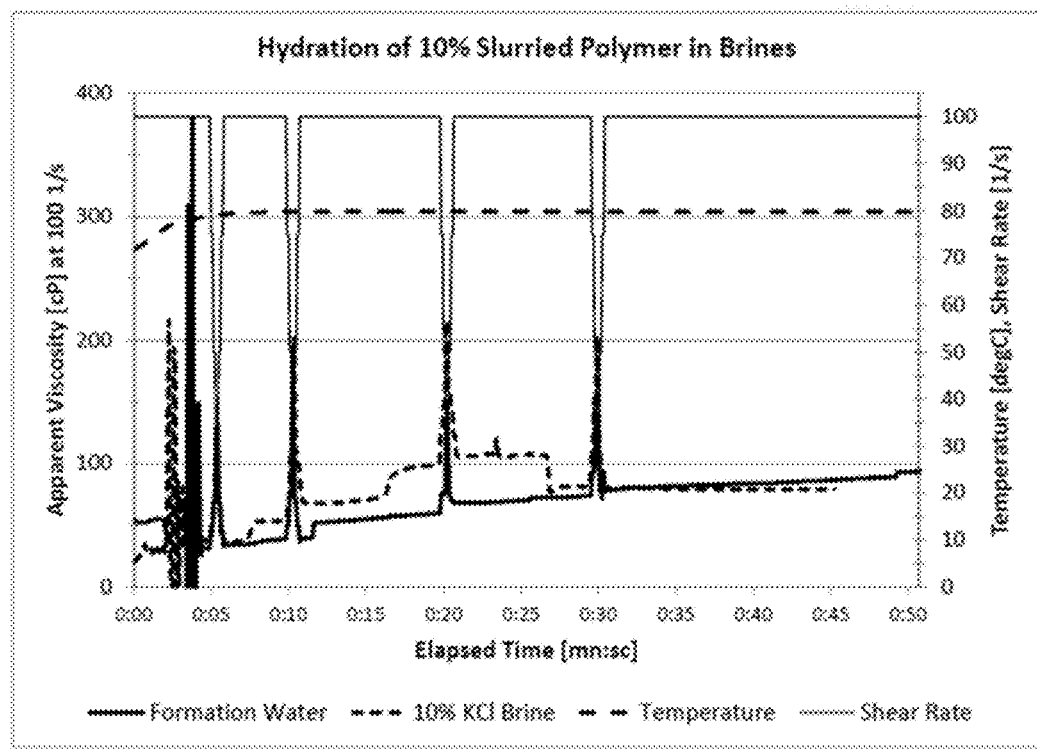
FIG. 5 shows a plot of the hydration of slurried polymers in 10% KCl brine or a simulated formation fluid.

The hydration rate of a slurry of Polyacrylamide-1 (see above) in two solutions with different salinities were tested by measuring the viscosity increase over time for a slurry of 10 wt. % hydratable polymer, 2 wt. % mineral clay mixture (Garamite 1958) as a suspending agent, and 88 wt. % EGMBE carrier fluid. Equivalent volumes of the slurry and 10 wt. % KCl brine or a simulated formation fluid were then mixed together. The ionic composition of the simulated formation fluid is shown in Table 3 above. The hydration testing was done at a temperature of 80° C. and a pressure of 1000 psi. The results of the test are shown in the plot of FIG. 5.

Figure 6:
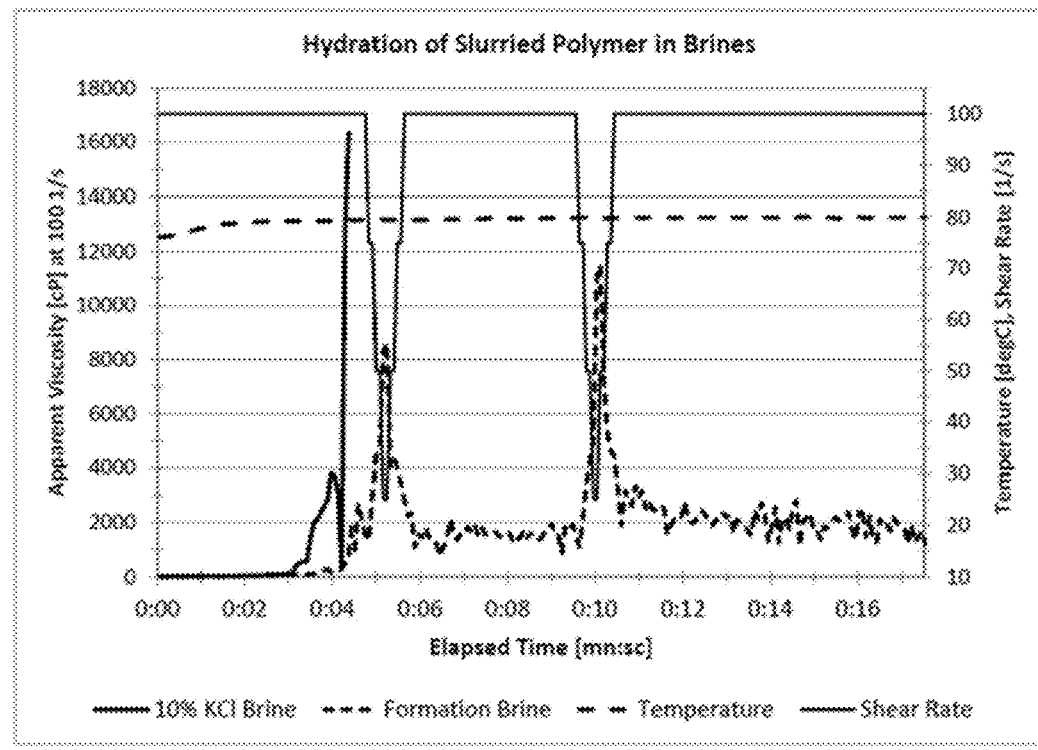
FIG. 6 shows a plot of the hydration of slurried polymers in 10% KCl brine or a simulated formation fluid.

The hydration rate of a slurry of Polyacrylamide-3 (see above) in two solutions with different salinities were tested by measuring the viscosity increase over time for a slurry of 10 wt. % hydratable polymer, 2 wt. % mineral clay mixture (Garamite 1958) as a suspending agent, and 88 wt. % EGMBE carrier fluid. Equivalent volumes of the slurry and 10 wt. % KCl brine or a simulated formation fluid were then mixed together. The ionic composition of the simulated formation fluid is shown in Table 3 above. The hydration testing was done at a temperature of 80° C. and a pressure of 1000 psi. The results of the test are shown in the plot of FIG. 6. As a general note for this test, in the formation water 85% of the Polyacrylamide-3 was stuck on the bob of the rheometer with the remaining 15% of hydrated polymer in solution.

Example 7

Crosslinking Testing

The crosslinking time of polymer slurries including the crosslinking agent hexamethylenetetramine (HETA) was measured.

Figure 7:
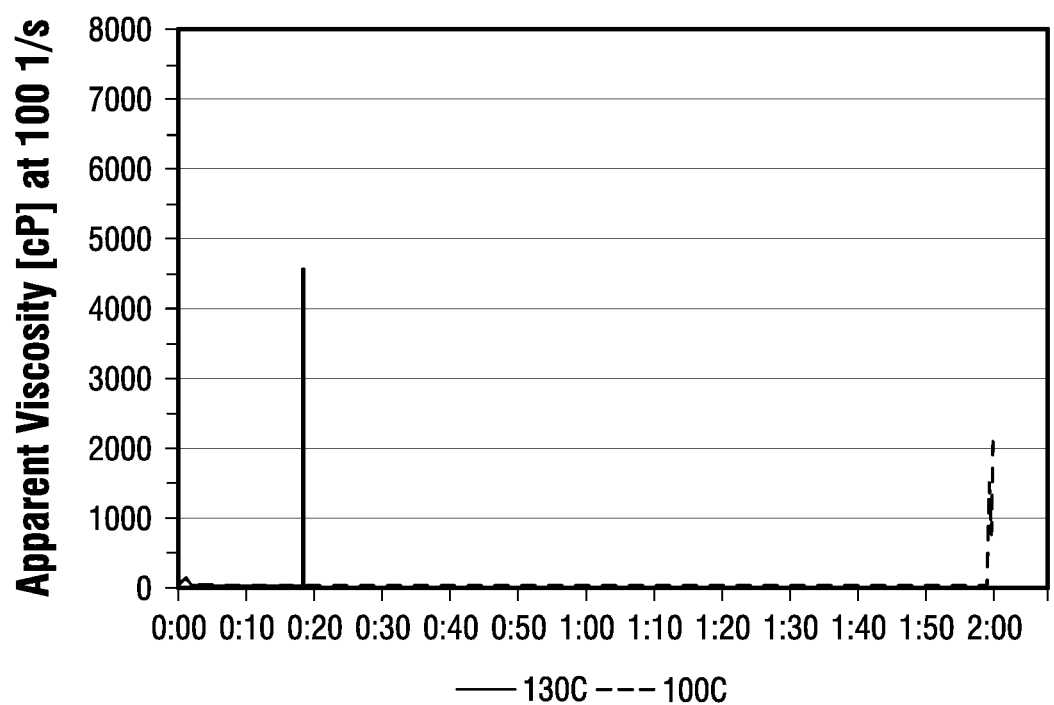
FIG. 7 shows a plot of the crosslinking of water-free polymer slurries containing a crosslinking agent mixed with tap water.

A slurry of 20 wt. % Polyacrylamide-1 (see above), 2 wt. % mineral clay mixture (Garamite 1958) as a suspending agent, 77 wt. % EGMBE carrier fluid, and 1 wt. % HETA as a crosslinking agent was prepared. Equivalent volumes of the slurry and tap water were then mixed together and viscosity development as a function of time was measured at both 100° C. and 130° C. The results of the test are shown on the plot of FIG. 7. In both cases, a rigid, but elastic, crosslinked polymeric gel was formed.

Figure 8:
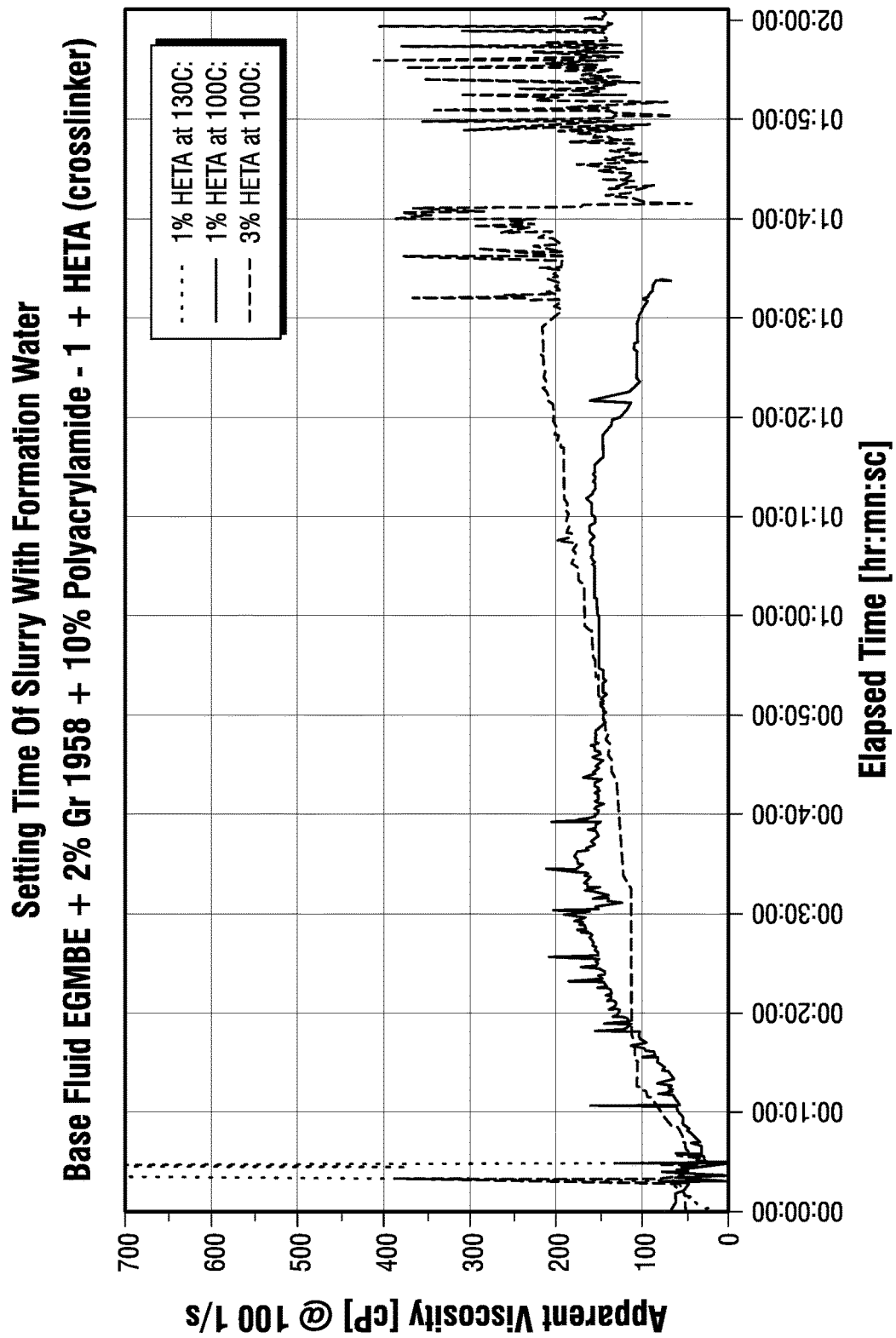
FIG. 8 shows a plot of the crosslinking of water-free polymer slurries containing a crosslinking agent mixed with simulated formation fluid.

A slurry of 10 wt. % Polyacrylamide-1 (see above), 2 wt. % mineral clay mixture (Garamite 1958) as a suspending agent, 87 wt. % EGMBE carrier fluid, and 1 wt. % HETA as a crosslinking agent was prepared. Equivalent volumes of slurry and simulated formation water (see Table 3 above) were then mixed together and viscosity development as a function of time was measured at both 100° C. and 130° C. Another slurry of 10 wt. % Polyacrylamide-1 (see above), 2 wt. % mineral clay mixture (Garamite 1958) as a suspending agent, 85 wt. % EGMBE carrier fluid, and 3 wt. % HETA as a crosslinking agent was prepared. Equivalent volumes of the slurry and simulated formation water (see Table 3 above) were then mixed together and viscosity development as a function of time was measured at 100° C. The results of these tests are shown on the plot of FIG. 8. A reduction in hydrolysis of the crosslinking agent into phenol and aldehyde, which in turn react with amide groups to crosslink the polymer, is expected and due to the high salt content of the simulated formation water. Nonetheless, in all cases, a rigid, but elastic, crosslinked polymeric gel was formed, however in the sample measured at 130° C. the crosslinking was almost instantaneous (see the high rate of viscosity increase in FIG. 8). At 100° C., an increased concentration of the crosslinking agent helps to ensure crosslinking because the hydrolysis of the crosslinking agent is slower at lower temperatures.

A slurry of 10 wt. % Polyacrylamide-3 (see above), 2 wt. % mineral clay mixture (Garamite 1958) as a suspending agent, 87 wt. % EGMBE carrier fluid, and 1 wt. % HETA as a crosslinking agent was prepared. Equivalent volumes of slurry and simulated formation water (see Table 3 above) were then mixed together and viscosity development as a function of time was measured at both 100° C. and 130° C. Each sample crosslinked, but the crosslinked polymers are described as friable gels which break easily. This state may be an indication that the samples are too highly crosslinked because a highly crosslinked polymer tends to create a rigid, but brittle, gel.

Example 8

Effect of a Crosslinking Accelerator

A crosslinking accelerator was examined to determine if the setting time of a hydratable polymer slurry containing HETA could be accelerated at lower temperatures. Specifically, the use of acids may accelerate the hydrolysis of HETA, the hydrolysis being what releases the aldehyde and/or phenol that crosslink the hydratable polymer slurry. In this example the crosslinking accelerator is the solid organic acid polyglycolic acid (PGA). Upon its hydrolysis, the PGA produces glycolic acid and the rate of its hydrolysis is dependent upon the fluid temperature and the particle size of the PGA.

Two hydratable polymer slurries were prepared: (1) 20 wt. % Polyacrylamide-1 (see above), 2 wt. % mineral clay mixture (Garamite 1958) as a suspending agent, 76 wt. % EGMBE carrier fluid, 1 wt. % PGA as a crosslinking accelerator, and 1 wt. % HETA; and (2) 20 wt. % Polyacrylamide-1 (see above), 2 wt. % mineral clay mixture (Garamite 1958) as a suspending agent, 77 wt. % EGMBE carrier fluid, and 1 wt. % HETA as a crosslinking agent was prepared. Equivalent volumes of the respective slurry and tap water were then mixed together and viscosity development as a function of time was measured at 80° C., 100° C., and 130° C. to determine the crosslinking/set times for the sample with and without the crosslinking accelerator. The results of this test are shown in Table 6 below.

TABLE 5

| Temperature (° C.) | Polymer Gel Crosslinking Time (hr:min) | |
| --- | --- | --- |
| | No Crosslinking Accelerator | 1% PGA |
| 80 | No set | 2:00 |
| 100 | 1:50 | 0:30 |
| 130 | 0:20 | — |

Example 9

Effect of Crosslinking Accelerator Concentration

A base slurry of hydratable polymer was prepared with 20 wt. % Polyacrylamide-1 (see above), 2 wt. % mineral clay mixture (Garamite 1958) as a suspending agent, EGMBE carrier fluid, optionally PGA as a crosslinking accelerator, and HETA as a crosslinking agent. The amounts of the PGA and HETA are as indicated in Table 7 below, with the remainder of the composition being the EGMBE carrier fluid.

TABLE 6

| Test | Temperature (° C.) | Crosslinking Agent and Accelerator | Crosslinking/Set Time (hr:min) | Final Consistency |
|---|---|---|---|---|
| 1 | 90 | 3% HETA | >1:00 | Fluid |
| 2 | 90 | 3% HETA + 1% PGA | 0:41 | Doughy/Fluid |
| 3 | 90 | 3% HETA + 3% PGA | 0:35 | Hard-Flexible |
| 4 | 110 | 3% HETA | 0:27 | Hard |
| 5 | 110 | 3% HETA + 1% PGA | 0:08 | Hard-Flexible |

Example 10

Water-Free Slurry Composition with Mineral Oil Carrier Fluid

A slurry was prepared having the composition shown in Table 8. The carrier fluid used was mineral oil (Simoil SN100). The mineral clay mixture used as the suspending agent is Garamite 1958, available from BYK Additives & Instruments. The suspension stabilizer used was diutan gum. Polyacrylamide-1 is Alcoflood® 254S, a granular solid acryalamide sodium acrylate copolymer available from BASF.

TABLE 7

| Components | w/w (%) |
|---|---|
| Carrier Fluid | 78.3 |
| Mineral Clay Mixture | 1.2 |
| Suspension Stabilizer | 0.5 |
| Polyacrylamide-1 | 20 |

The slurry stability was tested by placing a specific volume of slurry in a graduated cylinder and allowing the slurry to age, un-agitated, at room temperature while recording the volume percent of free fluid observed over time. The results of this test are shown in Table 9 below. In this table, "traces" indicates that the separation % is small enough to not be measurable.

TABLE 8

| Time (hr) | Separated Carrier Fluid Volume (%) |
|---|---|
| 2 | 0 |
| 8 | 0 |
| 12 | 0 |
| 24 | traces |
| 30 | 4 |

When this slurry was mixed with an equal volume of simulated formation water (see Table 3 above) by vigorous shaking for one minute, the hydratable polymer sets as a rigid gel and no phase separation is observed.

A similar slurry was formulated to the slurry above with the exception that 3 wt. % HETA crosslinking agent was added (thus 75.3% by weight was carrier fluid). The viscosity development of this slurry over time while statically aging at 100° C. after being mixed with an equivalent volume of simulated formation water (see Table 3 above) is shown in Table 10 below.

TABLE 9

| Time (hr) | Slurry Set Behavior |
|---|---|
| 0.5 | Viscous Gel |
| 1 | Viscous Gel |
| 2 | Less Viscous Gel |
| 4 | Less Viscous Gel |
| 6 | Hard-Rigid |
| 12 | Rigid Gel |

Example 11

Use of Zirconium-based Crosslinking Agent

The zirconium based crosslinking agent used in this example is a solid crosslinking agent complex having zirconium ion complexed by a hydroxyalkylated ethylene diamine ligand.

Initial tests were performed to determine the ability of the zirconium-based crosslinking agent in crosslinking Polyacrylamide-1 and Polyacrylamide-2. In these tests, the zirconium-based crosslinking agent was added to hydrated polymer solutions in fresh water at room temperature. In each test, 1 wt. % of the zirconium ion complexed by a hydroxyalkylated ethylene diamine ligand was added to 99 wt. % of a solution having tap water and 5.25 wt. % of the respective polyacrylamide therein The results of the initial tests are shown in Table 11 below.

TABLE 10

| | Test No. | pH | Result |
|---|---|---|---|
| Polyacrylamide-1 | 1 | 8 | No visible viscosity increase |
| | 2 | 5.5 | Rigid Gel is Formed |
| | 3 | 10-11 | No visible viscosity increase |
| Polyacrylamide-2 | 4 | 8 | No visible viscosity increase |
| | 5 | 5.5 | Rigid Gel is Formed |
| | 6 | 10-11 | No visible viscosity increase |

After the initial tests confirmed that the zirconium-based crosslinking agent could crosslink the polyacrylamide polymers, further tests were performed using a water-free hydratable polymer slurry mixed with tap water to more closely simulate conditions experienced downhole. The composition of the water-free hydratable polymer slurry was as follows: 88 wt. % EGMBE carrier fluid, 2 wt. % mineral clay mixture (Garamite 1958) suspension agent, and 10 wt. % Polyacrylamide-1 (see above). Table 12 shows the results of mixing 40 wt. % of the water-free hydratable slurry, the water-free hydratable slurry containing various amounts of the zirconium-based crosslinking agent as indicated in the table, with 60 wt. % of tap water. The initial pH is the pH of the tap water. The final pH was arrived at by the addition of fumaric acid (2-butenedioic acid) to the polymer suspension.

TABLE 11

| Test No. | Zr-Based Crosslinking Agent (wt. %) | pH Initial | pH Final | Temperature (° C.) | Results |
|---|---|---|---|---|---|
| 7 | 1 | 8 | 5.3 | 25 | Viscosity Growth - No setting |
| 8 | 1 | 8 | 5.0 | 80 | Viscosity Growth - No setting |
| 9 | 1 | 8 | 4.5 | 24 | Gel Partially Formed |
| 10 | 3 | 8 | 4.0-5.0 | 24 | Viscosity Growth - No setting |
| 11 | 3 | 8 | 5.6 | 80 | Rigid Gel |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for controlling water permeability of a subterranean formation, comprising:
   preparing a water-free slurry comprising:
   a carrier fluid consisting of a mutual solvent;
   a suspension agent comprising a mineral clay mixture that has been treated with an alkyl quaternary ammonium compound;
   a hydratable polymer in the form of microbeads;
   a crosslinking agent for the hydratable polymer; and
   injecting the water-free slurry into a target zone in the subterranean formation, wherein the water-free slurry contacts formation water that naturally resides in the subterranean formation and forms a gel.

2. The method of claim 1, wherein the water-free slurry further comprises a crosslinking accelerator selected from group consisting of acid derivatives of esters, ortho esters, poly(ortho esters), aliphatic polyesters, lactides, poly(lactides), glycolides, poly(glycolides), lactones, poly(ε-caprolactones), poly(hydroxybutyrates), anhydrides, poly(anhydrides), and poly(amino acids).

3. The method of claim 1, wherein the mutual solvent is one or more members of the group consisting of 2-butoxyethanol, glycols and glycol ethers.

4. The method of claim 1, wherein the mineral clay mixture comprises:
   a composition (a) selected from the group consisting of sepiolite, palygorskite and mixtures of sepiolite and palygorskite, present at a concentration ranging from 50% to 95% by weight of the mineral clay mixture; and
   a composition (b) comprising a smectite, present at a concentration that is the balance by weight of the mineral clay mixture.

5. The method of claim 1, wherein the hydratable polymer is selected from the group consisting of polyacrylamide and acrylamide copolymers thereof, guar, hydroxypropyl guar (HPG), hydrophobically modified hydroxypropyl guar (HMHPG), carboxymethyl guar (CMG), carboxymethyl hydroxypropyl guar (CMHPG), carboxymethyl hydroxyethyl cellulose (CMHEC), carboxymethylcellulose, hydroxyethylcellulose, hydroxypropylcellulose, xanthan gum, modified starches, glucomannan gums, succinoglycan, scleroglycan, o-carboxychitosans, polyvinyl saccharides, and heteropolysaccharides.

6. The method of claim 1, wherein the injecting occurs prior to a stimulation treatment.

7. The method of claim 1, wherein the wellbore is a water injection well.

8. The method of claim 1, wherein the injecting places the water-free slurry in the annular space of a wellbore casing.

* * * * *